United States Patent
Li et al.

(10) Patent No.: US 12,065,360 B1
(45) Date of Patent: Aug. 20, 2024

(54) METHOD FOR PREPARING SOFT MAGNETIC MANGANESE-ZINC FERRITE COMPOSITE BY REMOVING IMPURITIES FROM INDUSTRIAL WASTE STEP BY STEP

(71) Applicant: CHONGQING SHANGJIA ELECTRONIC CO., LTD., Chongqing (CN)

(72) Inventors: Shuchun Li, Chongqing (CN); Liang Fu, Chongqing (CN); Xinren Liao, Chongqing (CN); Juncai Ma, Chongqing (CN); Ping Li, Chongqing (CN); Zhan Xu, Chongqing (CN); Weipeng Zhang, Chongqing (CN)

(73) Assignee: CHONGQING SHANGJIA ELECTRONIC CO., LTD., Chongqing (CN)

( * ) Notice: Subject to any disclaimer, the term of this patent is extended or adjusted under 35 U.S.C. 154(b) by 0 days.

(21) Appl. No.: 18/537,945

(22) Filed: Dec. 13, 2023

(30) Foreign Application Priority Data

Jul. 12, 2023 (CN) .......................... 202310850488.6

(51) Int. Cl.
- *C01G 49/00* (2006.01)
- *C01G 9/06* (2006.01)
- *C01G 45/10* (2006.01)

(52) U.S. Cl.
CPC .......... *C01G 49/0072* (2013.01); *C01G 9/06* (2013.01); *C01G 45/10* (2013.01)

(58) Field of Classification Search
CPC ....... C01G 49/0072; C01G 9/06; C01G 45/10
See application file for complete search history.

(56) References Cited

U.S. PATENT DOCUMENTS

| 2011/0123419 A1* | 5/2011 | Shin ...................... C01G 45/10 423/49 |
|---|---|---|
| 2017/0087199 A1 | 3/2017 | Patron et al. |
| 2017/0096418 A1 | 4/2017 | Patron et al. |

FOREIGN PATENT DOCUMENTS

| CN | 101531503 | 9/2009 |
|---|---|---|
| CN | 113444880 | 9/2021 |
| CN | 114930617 A | 8/2022 |
| CN | 115140777 | 10/2022 |
| CN | 115894050 | 4/2023 |
| EP | 3689497 A1 | 8/2020 |

OTHER PUBLICATIONS

Chang-Hong et al. "Study on the preparation of Mn—Zn soft magnetic ferrite powders from waste Zn—Mn dry batteries" Waste Management, 28, (2008), p. 326-332 (Year: 2008).*

Liu, Hong-Wei et al. "Determination of Ultra-trace Iron in High Purity Rare Earth and Rare Earth Oxide by Inductively Coupled Plasma-Tandem Mass Spectrometry" vol. 51, No. 1518-1525 Page, Issue date Sep. 2023.

He, Haixia. "Resource Utilization of Manganiferous Wastewater for Preparation of Manganese Carbonate" No. B015-353 Page, Issue date May 2019.

* cited by examiner

*Primary Examiner* — Anthony J Zimmer
*Assistant Examiner* — Syed T Iqbal
(74) *Attorney, Agent, or Firm* — Daniel M. Cohn; Howard M. Cohn

(57) ABSTRACT

Provided is a method for preparing a soft magnetic manganese-zinc ferrite composite by removing impurities from industrial waste step by step. Manganese-containing waste residue is crushed and dried, and then mixed with a flux in a muffle furnace and roasted at a temperature below 1000° C. till solid-liquid stratification; then, multi-step impurity removal is performed to obtain a high-purity quaternary purification solution of manganese sulfate. Similarly, zinc residue is melted to remove impurities, and then multi-step impurity removal is performed to obtain a high-purity quaternary purification solution of zinc sulfate. According to a manganese-zinc-iron ratio required for the manganese-zinc ferrite, the two purification solutions are mixed, and ferrous sulfate is added. The mixed purification solution is coprecipitated with ammonium bicarbonate, washing is performed, and co-precipitated powder is decomposed into ferric oxide, manganese tetroxide and zinc oxide which are then roasted to obtain the manganese-zinc ferrite composite.

7 Claims, No Drawings

METHOD FOR PREPARING SOFT MAGNETIC MANGANESE-ZINC FERRITE COMPOSITE BY REMOVING IMPURITIES FROM INDUSTRIAL WASTE STEP BY STEP

BACKGROUND OF THE INVENTION

1. Technical Field

The present invention belongs to the field of resource recycling of industrial waste, and in particular to a method for preparing a soft magnetic manganese-zinc ferrite composite by removing impurities from industrial waste step by step.

2. Description of Related Art

Manganese-containing waste residues include, for example, manganese anode slime, electrolytic manganese residue, marine manganese nodules, and perilladehyde waste manganese residue.

Manganese anode slime: During the production process of electrolytic manganese metal, a large amount of anode slime will be inevitably produced in the anode area of the electrolytic cell. For every ton of electrolytic manganese produced, 0.05 to 0.08 ton of anode slime will be produced. Mn in anode slime which mainly exists in the form of manganese, divalent manganese and tetravalent manganese is a good manganese resource. The main impurities are S, Ca, Mg, Al, Si, Pb, Sn, Sb, etc., resulting in the complex composition of electrolytic manganese anode slime. In industry, it is generally used as raw materials for pyrolusite, and manganese sulfate is produced by iron powder reduction process, ferrous sulfate reduction leaching process, two-ore roasting-water leaching process, or two-ore one-step process. However, no matter which process is used, the addition of solid reducing agents makes impurity removal for leaching manganese difficult and leads to a high recovery cost. Therefore, at present, domestic manufacturers generally store the manganese-containing waste residues as hazardous waste residues, use them as steel-making additives, or sell them cheaply rather than well developing and comprehensively using them, leading to a waste of resources, and causing a considerable degree of environmental pollution due to improper handling.

Electrolytic manganese residue is manganese-containing waste residue produced by manganese electrolysis.

Marine manganese nodules are ores deposited at the bottom of the ocean. They are particles formed by condensing metal particles in seawater using shark teeth, fish bones, and ejections from submarine volcanoes in the ocean as the matrix. Manganese nodules are mainly composed of manganese oxide and iron oxide, and also contain various other metallic elements. Manganese nodules on the ocean floor are still growing at a rate of 10 million to 15 million tons per year, which has huge potential economic value. Manganese nodules contain Mn (27-30%), and also contain a small amount of Ni, Cu, Co, Fe, Si, Al, and a very small amount of Ca, Mg, Ti, Sn, Pb, Sb and other metal elements. Marine manganese nodules exist in the form of mixtures of insoluble aluminosilicates and permanganates, in which Mn element mainly exists in the form of high-valent oxides, with a stable crystal structure and insoluble in acid and alkali solutions. Usually, the mineral structure of nodules needs to be destroyed. The main treatment methods are fire reduction, wet reduction and biological leaching. In these methods, wet reduction of manganese dioxide is an important way for manganese ore smelting, with the highest leaching rate of Mn but high consumption of acid and alkali and big challenge to environmental protection. The biological leaching has long process cycle and is not suitable for large-scale production. The fire reduction of Mn requires high energy consumption and produces a large amount of Mn-rich residue which requires a complicated and long subsequent treatment process. In order to better reduce high-valent Mn to low-valent Mn from insoluble aluminosilicate and permanganate, the marine manganese nodules are required to be very fine in particle size. Disclosed in CN1037785C is a method for extracting manganese by reducing marine manganese nodules with aromatic amines. In this method, the leaching rate can reach up 90% or above, the kinetic characteristics of the leaching reaction are good, and the leaching speed is high. However, since the insoluble structure of marine manganese nodules is not destroyed, it is required that the particle size of marine manganese nodules is less than 0.5 mm and the actual particle size is less than 0.074 mm, the material mixing process takes a long time, and the extraction efficiency of Mn is not stable (87.16-98.41%).

Perillaldehyde is naturally found in *perilla* oil, basil oil and bergamot oil. It has refreshing, cherry and oil aromas, and can be used to prepare floral daily use chemical essences with the scent of jasmine, *narcissus* and the like, as well as apple, citrus and spearmint-flavored food essences. The industrial production of perillaldehyde in China mainly adopts oxidation of perillyl alcohol, that is, using an oxidant to oxidize *perilla* alcohol into perillaldehyde. The oxidant used is usually electrolytic manganese dioxide. During the oxidation process of *perilla* alcohol, a large amount of manganese dioxide is reduced by *perilla* alcohol to divalent manganese (mainly in the form of solid manganese monoxide), which is mixed with unreduced manganese dioxide to form manganese-containing waste residue with the manganese content of 90% to 92%, and other residues are alumina, silicon oxide, iron oxide, potassium salt, sodium salt, organic residue, etc.

At present, the industrial treatment of manganese-containing waste residue and the comprehensive utilization of manganese-containing waste residue are mainly based on a fire process, a wet process and biological leaching. Among them, wet reduction treatment of manganese waste residue is the treatment technology with the highest leaching rate, and has been widely used in large-scale industrial production. Since it is difficult to acidolyze the manganese dioxide in the manganese waste residue, a reducing agent needs to be added to reduce the manganese dioxide to low-valent manganese. However, there are still some shortcomings in the extraction and reduction process of existing wet reduction treatment of manganese waste residue. In order to fully reduce manganese dioxide in manganese waste residue, the requirement for fineness of a reduced sample is very high (CN1037785C), but the excessively fine grinding process consumes a lot of time and energy. The use of molten salt fusion leaching can not only remove a large amount of impurities from manganese waste residue, but also effectively improve the leaching efficiency of manganese. However, the high eutectic temperature of the existing molten salt system leads to high energy consumption, which still cannot meet low-carbon and environmentally friendly clean production requirements.

Industrial wastes such as zinc-containing waste residue, zinc slime, hot-dip galvanizing scrap and zinc ash usually contain a large amount of the metallic element zinc, which provides the possibility of using industrial waste resources to prepare manganese-zinc ferrite. The use of zinc-rich solid waste to prepare manganese-zinc ferrite can not only recycle the zinc in the solid waste, but also eliminate its potential harm to the environment and human health, reflecting the requirements for correctly handling the relationship between ecological environment protection and development. Although the long-term resource utilization of industrial waste has been extended to use of a variety of solid wastes as metal sources for manganese-zinc ferrite, it still faces many technical difficulties, such as poor purification effect, use of purification agents causing environment pollution and inadequate in source, serious loss of main elements caused by low purification efficiency, high labor intensity, high energy consumption, and high production costs. Co-precipitation impurity removal leads to the agglomeration of manganese-zinc ferrite composite powder, which seriously affects product performance and causes the failure to meet the development requirements of electronic devices.

BRIEF SUMMARY OF THE INVENTION

In view of the existing technical problems, an objective of the present invention is to provide a method for preparing a soft magnetic manganese-zinc ferrite composite by removing impurities from industrial waste step by step, which can realize the preparation of a soft magnetic manganese-zinc ferrite composite from manganese-containing waste residue and industrial zinc-containing waste residue, thereby achieving the purpose of waste utilization with low recycling cost.

To achieve the above objective, the present invention is implemented through the following technical solution: a method for preparing a soft magnetic manganese-zinc ferrite composite by removing impurities from industrial waste step by step, wherein recovery and preparation are performed according to the following steps:

1) recovery of manganese from manganese-containing waste residue the manganese-containing waste residue is one of manganese anode slime, electrolytic manganese residue, marine manganese nodules, and manganese-containing waste residue produced by perillaldehyde;

crushing the manganese-containing waste residue until the particle diameter is less than or equal to 5 mm; drying the crushed waste residue; adding a flux according to the mass of the manganese-containing waste residue, wherein the mass ratio of the flux to the manganese-containing waste residue is (10-2):1; placing the manganese-containing waste residue in a muffle furnace and gradually heating up for roasting until solid-liquid stratification appears, wherein the roasting temperature ranges from 900° C. to 1000° C. and is held for 30-45 min; after solid-liquid separation, reusing the liquid phase as a flux, and washing solid-phase sediments thoroughly with pure water to remove soluble salts remaining in the solid-phase sediments; adding water to the solid-phase sediments to prepare a slurry, sieving the slurry with a 120-mesh sieve and then placing the slurry in a reaction kettle with a cooling device; adding excess sulfuric acid according to the manganese content in the solid-phase sediments; in vacuum or in the presence of an inert gas, at room temperature, adding a reducing agent to reduce manganese dioxide in the manganese slurry into low-valent manganese which reacts quickly with excess sulfuric acid to convert all manganese into a manganese sulfate solution, and filtering the manganese sulfate solution to remove impurities to obtain a primary purification solution of manganese sulfate; adding a flocculant to remove a small amount of residual Al and Si from the primary purification solution of manganese sulfate, and filtering the primary purification solution of manganese sulfate to obtain a secondary purification solution of manganese sulfate; adding ammonia water to adjust the pH value of the manganese sulfate solution to 5 to 7, performing separation by pressure filtration to obtain a tertiary purification solution of manganese sulfate, adding 1% to 2% (1% to 2% of the mass of the tertiary purification solution of manganese sulfate, the same below) ammonium sulfide to further remove remaining metal ions from the tertiary purification solution of manganese sulfate, and then filtering the tertiary purification solution of manganese sulfate to obtain a high-purity quaternary purification solution of manganese sulfate;

2) recovery of zinc from zinc-containing waste residue the zinc-containing waste residue is at least one of zinc slime, hot-dip galvanizing scrap, and zinc ash, crushing the zinc-containing waste residue until the particle diameter is less than or equal to 5 mm, drying the crushed waste residue and mixing the waste residue thoroughly with a flux; placing the zinc-containing waste residue in a muffle furnace and heating up to 390° ° C. such that the flux begins to melt and gradually penetrates into the zinc-containing waste residue, and then further heating up to 750° C. and holding the temperature for 30-45 min, removing the liquid phase portion from the melt, washing solid phase sediments with pure water, adding excess sulfuric acid according to the content of zinc oxide in the solid-phase sediments to obtain a zinc sulfate solution, and filtering the zinc sulfate solution to remove impurities to obtain a primary purification solution of zinc sulfate; adding a flocculant to remove a small amount of residual Al and Si from the primary purification solution of zinc sulfate, and filtering the primary purification solution of zinc sulfate to obtain a secondary purification solution of zinc sulfate; adding ammonia water to adjust the pH value of the manganese sulfate solution to 5 to 7, and performing separation by pressure filtration to obtain a tertiary purification solution of zinc sulfate; adding 1% to 2% (1% to 2% of the mass of the tertiary purification solution of zinc sulfate, the same below) ammonium sulfide to further remove metal ions from the tertiary purification solution of zinc sulfate, and then filtering the tertiary purification solution of zinc sulfate to obtain a high-purity quaternary purification solution of zinc sulfate, wherein the flux comprises, by weight, the following components: 30%-50% of $KZrF_5$ and 70%-50% of $Na_3AlF_6$; and 3) mixing the quaternary purification solution of manganese sulfate and the quaternary purification solution of zinc sulfate according to a required manganese-zinc ratio in the manganese-zinc ferrite, adding ferrous sulfate with a required Fe ratio, and coprecipitating the mixed purification solution with ammonium bicarbonate, performing washing, decomposing in a decomposing furnace the co-precipitated powder into ferric oxide, manganese tetroxide and zinc oxide, and then roasting ferric oxide, manganese tetroxide and zinc oxide to obtain the manganese-zinc ferrite composite.

In the above solution: the mass ratio of the zinc-containing waste residue to the flux is 1:(2-10).

In the above solution: the reducing agent is one of aniline, diaminobenzene, triaminobenzene, phenol, diphenol, phloroglucinol, and aminophenol. The reducing agent is a reducing agent commonly used at present, and the reduction time is 5 min to 10 min.

In the above solution: the reducing agent is trialdehyde phloroglucinol or hexaaminobenzene, the amount of the reducing agent added is 20% to 50% of the amount of manganese slurry, and the reduction time ranges from 3 min to 5 min.

In the above solution: in step 1), according to a molar ratio, the ratio of the amount of sulfuric acid added to the molar mass of manganese is 2:1;

In step 2), according to a molar ratio, the ratio of the amount of sulfuric acid added to the molar mass of zinc is (1.2-2.0):1.

In the above solution: the concentration of sulfuric acid is 400 g/L.

In the above solution: in steps 1) and 2), drying is performed at 100-120° C.

In the above solution: the flocculant is polyacrylamide. The amount of polyacrylamide added is 1% to 3% of the mass of the solution.

The manganese-containing waste residue and the zinc-containing waste residue in industrial waste usually contain large amounts of Si, Al, K, Na and other constant impurity elements as well as other metal element impurities. Among them, Si and Al usually form a tetrahedral structure that is insoluble in acid, making it very difficult to remove impurities by acid dissolution. The present invention first uses a melting process to remove a large amount of impurities such as Si, Al, K, and Na. The flux composed of $KZrF_5$ and $Na_3AlF_6$ begins to melt at about 390° C. At this time, $KZrF_5$ begins to decompose to form KF and $ZrF_4$. Beneficially, the free K+ and F generated by KF melting and dissociation have strong corrosive and penetrating effects and can easily enter manganese-containing waste residue and zinc-containing waste residue, thus accelerating the melting process of manganese-containing waste residue and zinc-containing waste residue. As the temperature increases, the melting of $Na_3AlF_6$ is promoted. When the temperature reaches 1000° C., the entire flux is completely melted and brings the Al, Si, K, and Na from the manganese-containing waste residue and the zinc-containing waste residue into liquid-phase components of the melt, and metal elements such as Mn, Zn, and Fe are in the form of solid-phase sediments in the lower layer of the liquid-phase molten salt, thereby removing a large amount of impurities such as Al, Si, K, and Na from the manganese-containing waste residue and the zinc-containing waste residue.

The manganese-containing waste residue is usually rich in manganese dioxide, which cannot be completely dissolved by acid leaching, thus affecting the leaching rate of manganese. The reducing agent in the present invention is trialdehyde phloroglucinol. Compared with the current reducing agents (aniline, phenol, diphenol, trisphenol and triaminobenzene), trialdehyde phloroglucinol has three hydroxyl groups and three aldehyde groups on its benzene ring at the same time and shows strong reducing properties, which can accelerate the conversion of manganese dioxide in solid-phase sediments to low-valent manganese, and also improve the conversion efficiency of other high-valent metals to low-valent metals. In vacuum or in the presence of an inert gas, oxygen in the air is prevented from entry, further improving the reduction efficiency. As a result, all manganese and zinc in the solid-phase sediments are completely converted into manganese sulfate and zinc sulfate during the acidification process by sulfuric acid.

Beneficial Effect (1) In the implementation of the technical solution, the melting heat treatment not only destroys the structure of manganese-containing waste residue and zinc-containing waste residue, which is beneficial to the release of manganese and zinc in the subsequent acid dissolution process, but also effectively removes a large amount of Al, Si, K, Na and other impurities from the manganese-containing waste residue and the zinc-containing waste residue. The leaching rates of manganese and zinc are both above 99.0%.

(2) Compared with the prior art, the technical solution is adopted to implement multi-stage impurity removal to obtain higher-purity manganese sulfate and zinc sulfate, and the purity of the quaternary purification solution of manganese sulfate and the purity of the quaternary purification solution of zinc sulfate can reach 99.5% or above, thereby providing high-quality raw materials for the preparation of high-performance manganese-zinc ferrite.

(3) Compared with the prior art, the technical solution used can shorten the roasting time by 15-20 min and reduce energy consumption.

DETAILED DESCRIPTION OF THE INVENTION

The present invention will be further described below in conjunction with embodiments.

EXAMPLE 1

1. Recovery of Manganese from Manganese-Containing Perillaldehyde Waste Residue:

The manganese-containing perillaldehyde waste residue (the content of manganese monoxide and manganese dioxide was 92%) was crushed to the particle diameter of 5 mm or below, and then dried at 100-120° C. until it reached constant weight.

A flux was added according to the mass of perillaldehyde waste residue, where the ratio of the flux added to the perillaldehyde waste residue was 2:1, and by mass, the flux comprised 50% of $KZrF_5$ and 50% of $Na_3AlF_6$.

The perillaldehyde waste residue was then placed in an electric furnace and heated. When the temperature reached 390° C., the entire molten salt system began to melt. Then the molten salt system was heated up to 1000° C. and held at this temperature for 30-45 min until solid-liquid stratification appeared. Impurities such as Si, Al, Na, and K in the manganese-containing waste residue entered the liquid-phase layer in the form of molten salts, and compounds of metals such as Mn, Fe, Pb, and Mg existed in solid-phase sediments. After solid-liquid separation, the liquid-phase components were discarded, and the solid-phase sediments were washed with pure water and then mixed with water to prepare a slurry. The slurry was sieved with a 120-mesh sieve and then placed in a reaction kettle with a cooling device.

Sulfuric acid (400 g/L) was added according to the content of manganese dioxide in the solid-phase sediments, where the molar ratio of sulfuric acid added to manganese was 2:1. At room temperature, the reaction kettle was vacuumed to prevent residual oxygen in the air from affecting the subsequent reduction efficiency of manganese dioxide. A reducing agent trialdehyde phloroglucinol was added in an amount which was 50% of the molar mass of manganese to reduce manganese dioxide to low-valent manganese.

The reduced low-valent manganese reacted with excess sulfuric acid to generate manganese sulfate. The reaction solution was filtered to remove Ca, Pb, Ba and other impurities existing in the form of sulfate sediments to obtain a primary purification solution of manganese sulfate.

A flocculant polyacrylamide was added (the amount of polyacrylamide added was 1% of the mass of the solution) to remove a small amount of residual Al and Si. The solution was filtered to remove impurities to obtain a secondary purification solution of manganese sulfate.

Ammonia water was added to adjust the pH value of the solution to 5-7, and separation by press filtration was then performed to obtain a tertiary purification solution of manganese sulfate.

1% ammonium sulfide was added to the tertiary purification solution of manganese sulfate. After impurity removal and filtering, a high-purity quaternary purification solution of manganese sulfate was obtained.

2. Recovery of Zinc from Hot-Dip Galvanizing Scrap

Hot-dip galvanizing scrap was crushed (particle diameter≤5 mm), then dried in an oven at a temperature of 100-120° C., and then well mixed with a flux, where the mass ratio of the zinc scrap to the flux was 1:5 and the flux comprised 50% of $KZrF_5$ and 50% of $Na_3AlF_6$.

The hot-dip galvanizing scrap was placed in a muffle furnace and heated to 390° C. such that the flux began to melt and gradually penetrated into the hot-dip galvanizing scrap. The hot-dip galvanizing scrap was further heated to 1000° C. and held at this temperature for 30-45 min, the liquid phase portion of the melt was removed, and solid-phase sediments were washed with pure water. Excess 400 g/L sulfuric acid was added according to the content of zinc oxide in the solid-phase sediments (the molar ratio of zinc to sulfuric acid was 1:2) to obtain a zinc sulfate solution. The solution was filtered to remove Ca, Pb, Ba and other impurities existing in the form of sulfate sediments to obtain a primary purification solution of zinc sulfate. 1% polyacrylamide was added to remove a small amount of residual Al and Si from the primary purification solution of zinc sulfate, and the primary purification solution of zinc sulfate was then filtered to obtain a secondary purification solution of zinc sulfate. Ammonia water was added to adjust the pH value of the manganese sulfate solution to 5 to 7. Separation by press filtration was performed to obtain a tertiary purification solution of zinc sulfate. 1% ammonium sulfide was added to further remove metal ions from the tertiary purification solution of zinc sulfate, and the tertiary purification solution of zinc sulfate was then filtered to obtain a high-purity quaternary purification solution of zinc sulfate.

3 Preparation of a Manganese-Zinc Ferrite Composite

The quaternary purification solution of manganese sulfate and the quaternary purification solution of zinc sulfate were mixed according to a required manganese-zinc ratio in the manganese-zinc ferrite. Ferrous sulfate with a required Fe ratio was added. The mixed purification solution was coprecipitated with ammonium bicarbonate, washing was performed, the co-precipitated powder was decomposed in a decomposing furnace into ferric oxide, manganese tetroxide and zinc oxide, and then ferric oxide, manganese tetroxide and zinc oxide were roasted to obtain a manganese-zinc ferrite composite. The decomposing operation was performed according to the method disclosed in CN 115894050.

EXAMPLE 2

1. Recovery of Manganese from Marine Manganese Nodules:

Marine manganese nodules were crushed and ground to 5 mm or below in particle diameter and then dried to a constant weight in an oven at 110° C. The pretreated marine manganese nodules and a flux were well mixed at a mass ratio of 1:10, where the flux comprised 40% of $KZrF_5$ and 60% of $Na_3AlF_6$. The pretreated marine manganese nodules were roasted at 1000° C. for 30-60 min in a muffle furnace until solid-liquid stratification appeared.

After solid-liquid separation, liquid-phase components were discarded, solid-phase sediments were washed with pure water and then mixed with water to prepare a slurry. The slurry was sieved with a 120-mesh sieve and then placed in a reaction kettle with a cooling device.

Sulfuric acid was added according to the content of manganese dioxide in the solid-phase sediments, where the molar ratio of sulfuric acid added to manganese was 2:1. At room temperature, the reaction kettle was vacuumed to prevent residual oxygen in the air from affecting the subsequent reduction efficiency of manganese dioxide. A reducing agent trialdehyde phloroglucinol was added in an amount which was 30% of the molar mass of manganese to reduce manganese dioxide to low-valent manganese. The reduced low-valent manganese reacted with excess sulfuric acid to generate manganese sulfate. The reaction solution was filtered to remove impurities to obtain a primary purification solution of manganese sulfate.

A flocculant polyacrylamide was added (the amount of polyacrylamide added was 1% of the mass of the solution) to remove a small amount of residual Al and Si. The solution was filtered to remove impurities to obtain a secondary purification solution of manganese sulfate.

Ammonia water was added to adjust the pH value of the solution to 5-7, and separation by press filtration was then performed to obtain a tertiary purification solution of manganese sulfate.

1% ammonium sulfide was added to the tertiary purification solution of manganese sulfate. After impurity removal and filtering, a high-purity quaternary purification solution of manganese sulfate was obtained.

2. Recovery of Zinc from Zinc Ash

Zinc ash was crushed (particle diameter≤5 mm), then dried in an oven at a temperature of 100-120° C., and then well mixed with a flux, where the mass ratio of the zinc ash to the flux was 1:10, and the flux comprised 30% of $KZrF_5$ and 70% of $Na_3AlF_6$.

The zinc ash was placed in a muffle furnace and heated to 390° C. such that the flux began to melt and gradually penetrated into the zinc ash. The zinc ash was further heated to 1000° C. and held at this temperature for 30-45 min, the liquid phase portion of the melt was removed, and solid-phase sediments were washed with pure water. Excess 400 g/L sulfuric acid was added according to the content of zinc oxide in the solid-phase sediments (the molar ratio of zinc to sulfuric acid was 1:1.8) to obtain a zinc sulfate solution. The solution was filtered to remove Ca, Pb, Ba and other impurities existing in the form of sulfate sediments to obtain a primary purification solution of zinc sulfate. Polyacrylamide was added (the amount of polyacrylamide added was 2% of the mass of the solution) to remove a small amount of residual Al and Si from the primary purification solution of zinc sulfate, and the primary purification solution of zinc sulfate was then filtered to obtain a secondary purification solution of zinc sulfate. Ammonia water was added to adjust the pH value of the manganese sulfate solution to 5 to 7. Separation by press filtration was performed to obtain a tertiary purification solution of zinc sulfate. 2% ammonium sulfide was added to further remove metal ions from the tertiary purification solution of zinc sulfate, and the tertiary purification solution of zinc sulfate was then filtered to obtain a high-purity quaternary purification solution of zinc sulfate.

3 Preparation of a Manganese-Zinc Ferrite Composite

The quaternary purification solution of manganese sulfate and the quaternary purification solution of zinc sulfate were mixed according to a required manganese-zinc ratio in the manganese-zinc ferrite. Ferrous sulfate with a required Fe ratio was added. The mixed purification solution was coprecipitated with ammonium bicarbonate, washing was performed, the co-precipitated powder was decomposed in a decomposing furnace into ferric oxide, manganese tetroxide and zinc oxide, and then ferric oxide, manganese tetroxide and zinc oxide were roasted to obtain a manganese-zinc ferrite composite. The decomposing operation was performed according to the method disclosed in CN 115894050.

EXAMPLE 3

1. Recovery of Manganese from Manganese Anode Slime

Manganese anode slime was crushed to 5 mm or below in particle diameter and then dried to a constant weight at a temperature of 100-120° C.

The dried manganese anode slime and a flux were well mixed at a ratio of 1:10, where the flux comprised 40% of $KZrF_5$ and 60% of $Na_3AlF_6$. The manganese anode slime was roasted at 900° C. for 30-60 min in a muffle furnace until solid-liquid stratification appeared.

After solid-liquid separation, liquid-phase components were discarded, and solid-phase sediments were washed with pure water and then mixed with water to prepare a slurry. The slurry was sieved with a 120-mesh sieve and then placed in a reaction kettle with a cooling device.

Sulfuric acid was added according to the content of manganese dioxide in the solid-phase sediments, where the molar ratio of sulfuric acid added to manganese was 2:1. At room temperature, the reaction kettle was vacuumed to prevent residual oxygen in the air from affecting the subsequent reduction efficiency of manganese dioxide. A reducing agent hexaaminobenzene was added in an amount which was 20% of the molar mass of manganese to reduce manganese dioxide to low-valent manganese. The reduced low-valent manganese reacted with excess sulfuric acid to generate manganese sulfate. The reaction solution was filtered to remove impurities to obtain a primary purification solution of manganese sulfate.

A flocculant polyacrylamide was added (the amount of polyacrylamide added was 1% of the mass of the solution) to remove a small amount of residual Al and Si. The solution was filtered to remove impurities to obtain a secondary purification solution of manganese sulfate.

Ammonia water was added to adjust the pH value of the solution to 5-7, and separation by press filtration was then performed to obtain a tertiary purification solution of manganese sulfate.

1% ammonium sulfide was added to the tertiary purification solution of manganese sulfate. After impurity removal and filtering, a high-purity quaternary purification solution of manganese sulfate was obtained.

2. Recovery of Zinc from Hot-Dip Galvanizing Scrap

Hot-dip galvanizing scrap was crushed (particle diameter≤5 mm), then dried in an oven at a temperature of 100-120° C., and then well mixed with a flux, where the mass ratio of the zinc scrap to the flux was 1:2 and the flux comprised 40% of $KZrF_5$ and 60% of $Na_3AlF_6$.

The hot-dip galvanizing scrap was placed in a muffle furnace and heated to 390° C. such that the flux began to melt and gradually penetrated into the hot-dip galvanizing scrap. The hot-dip galvanizing scrap was further heated to 1000° C. and held at this temperature for 30-45 min, the liquid phase portion of the melt was removed, and solid-phase sediments were washed with pure water. Excess 400 g/L sulfuric acid was added according to the content of zinc oxide in the solid-phase sediments (the molar ratio of zinc to sulfuric acid was 1:1.5) to obtain a zinc sulfate solution. The solution was filtered to remove Ca, Pb, Ba and other impurities existing in the form of sulfate sediments to obtain a primary purification solution of zinc sulfate. Polyacrylamide was added (the amount of polyacrylamide added was 3% of the mass of the solution) to remove a small amount of residual Al and Si from the primary purification solution of zinc sulfate, and the primary purification solution of zinc sulfate was then filtered to obtain a secondary purification solution of zinc sulfate. Ammonia water was added to adjust the pH value of the manganese sulfate solution to 5 to 7. Separation by press filtration was performed to obtain a tertiary purification solution of zinc sulfate. 1% ammonium sulfide was added to further remove metal ions from the tertiary purification solution of zinc sulfate, and the tertiary purification solution of zinc sulfate was then filtered to obtain a high-purity quaternary purification solution of zinc sulfate.

3 Preparation of a Manganese-Zinc Ferrite Composite

The quaternary purification solution of manganese sulfate and the quaternary purification solution of zinc sulfate were mixed according to a required manganese-zinc ratio in the manganese-zinc ferrite. Ferrous sulfate with a required Fe ratio was added. The mixed purification solution was coprecipitated with ammonium bicarbonate, washing was performed, the co-precipitated powder was decomposed in a decomposing furnace into ferric oxide, manganese tetroxide and zinc oxide, and then ferric oxide, manganese tetroxide and zinc oxide were roasted to obtain a manganese-zinc ferrite composite. The decomposing operation was performed according to the method disclosed in CN 115894050.

While the embodiments of the invention have been shown and described, it should be understood by those skilled in the art that the various changes, modifications, substitutions and variations of the embodiments may be made without departing from the spirit and scope of the present disclosure. The scope of the invention is defined by the appended claims and their equivalents.

What is claimed is:

1. A method for preparing a soft magnetic manganese-zinc ferrite composite by removing impurities from industrial waste step by step, wherein recovery and preparation are performed according to the following steps:
   1) recovery of manganese from manganese-containing waste residue
      the manganese-containing waste residue being one of manganese anode slime, electrolytic manganese residue, marine manganese nodules, and the manganese-containing waste residue produced by perillaldehyde;
      crushing the manganese-containing waste residue until the particle diameter is less than or equal to 5 mm;

drying the crushed waste residue; adding a flux according to the mass of the manganese-containing waste residue, wherein the mass ratio of the flux added to the manganese-containing waste residue is (10-2):1; placing the manganese-containing waste residue in a muffle furnace and heating up for roasting until solid-liquid stratification appears, wherein the roasting temperature ranges from 900° C. to 1000° C. and is held for 30-45 min; after solid-liquid separation, reusing the liquid phase as the flux, and washing solid-phase sediments thoroughly with water to remove soluble salts remaining in the solid-phase sediment; adding water to the solid-phase sediments to prepare a slurry, sieving the slurry with a 120-mesh sieve and then placing the slurry in a reaction kettle with a cooling device; adding excess sulfuric acid according to the manganese content in the solid-phase sediments; in vacuum or in the presence of an inert gas, at room temperature, adding a reducing agent to reduce manganese dioxide in the manganese slurry into low-valent manganese which reacts quickly with excess sulfuric acid to convert all manganese into a manganese sulfate solution, and filtering the manganese sulfate solution to remove impurities to obtain a primary purification solution of manganese sulfate; adding a flocculant to remove residual Al and Si from the primary purification solution of manganese sulfate, and filtering the primary purification solution of manganese sulfate to obtain a secondary purification solution of manganese sulfate; adding ammonia water to adjust the pH value of the manganese sulfate solution to 5 to 7, performing separation by pressure filtration to obtain a tertiary purification solution of manganese sulfate, adding 1% to 2% ammonium sulfide to further remove remaining metal ions from the tertiary purification solution of manganese sulfate, and then filtering the tertiary purification solution of manganese sulfate to obtain a quaternary purification solution of manganese sulfate;

2) recovery of zinc from zinc-containing waste residue the zinc-containing waste residue being at least one of zinc slime, hot-dip galvanizing scrap, and zinc ash, crushing the zinc-containing waste residue until the particle diameter is less than or equal to 5 mm, drying the crushed waste residue and mixing the waste residue thoroughly with a flux;

placing the zinc-containing waste residue in a muffle furnace and heating up to 390° C. such that the flux begins to melt and gradually penetrates into the zinc-containing waste residue, and then further heating up to 750° C. and holding the temperature for 30-45 min, removing the liquid phase portion from the melt, washing solid phase sediments with water, adding excess sulfuric acid according to the content of zinc oxide in the solid-phase sediments to obtain a zinc sulfate solution, and filtering the zinc sulfate solution to remove impurities to obtain a primary purification solution of zinc sulfate; adding a flocculant to remove residual Al and Si from the primary purification solution of zinc sulfate, and then filtering the primary purification solution of zinc sulfate to obtain a secondary purification solution of zinc sulfate; adding ammonia water to adjust the pH value of the manganese sulfate solution to 5 to 7, and performing separation by pressure filtration to obtain a tertiary purification solution of zinc sulfate; adding 1% to 2% ammonium sulfide to further remove metal ions from the tertiary purification solution of zinc sulfate, and then filtering the tertiary purification solution of zinc sulfate to obtain a quaternary purification solution of zinc sulfate, wherein the flux comprises, by weight, the following components: 30%-50% of $KZrF_5$ and 70%-50% of $Na_3AlF_6$; and 3) Mixing the quaternary purification solution of manganese sulfate and the quaternary purification solution of zinc sulfate according to a required manganese-zinc ratio in the manganese-zinc ferrite, adding ferrous sulfate with a required Fe ratio, and coprecipitating the mixed purification solution with ammonium bicarbonate, performing washing, decomposing in a decomposing furnace the co-precipitated powder into ferric oxide, manganese tetroxide and zinc oxide, and then roasting ferric oxide, manganese tetroxide and zinc oxide to obtain the manganese-zinc ferrite composite, wherein the reducing agent is trialdehyde phloroglucinol.

2. The method for preparing a soft magnetic manganese-zinc ferrite composite by removing impurities from industrial waste step by step according to claim 1, wherein the molar ratio of the zinc-containing waste residue to the flux is 1:2-10.

3. The method for preparing a soft magnetic manganese-zinc ferrite composite by removing impurities from industrial waste step by step according to claim 2, wherein the amount of the reducing agent added is 20% to 50% of the molar mass of manganese in the manganese slurry, and the reduction time ranges from 3 min to 5 min.

4. The method for preparing a soft magnetic manganese-zinc ferrite composite by removing impurities from industrial waste step by step according to claim 3, wherein
in step 1), according to a molar ratio, the ratio of the amount of sulfuric acid added to the molar mass of manganese is 2:1;
in step 2), according to a molar ratio, the ratio of the amount of sulfuric acid added to the molar mass of zinc is 1.2-2.0:1.

5. The method for preparing a soft magnetic manganese-zinc ferrite composite by removing impurities from industrial waste step by step according to claim 4, wherein the concentration of sulfuric acid is 400 g/L.

6. The method for preparing a soft magnetic manganese-zinc ferrite composite by removing impurities from industrial waste step by step according to claim 5, wherein in steps 1) and 2), drying is performed at 100-120° C.

7. The method for preparing a soft magnetic manganese-zinc ferrite composite by removing impurities from industrial waste step by step according to claim 6, wherein the flocculant is polyacrylamide.

* * * * *